United States Patent
Lee et al.

(10) Patent No.: US 11,374,609 B2
(45) Date of Patent: Jun. 28, 2022

(54) APPARATUS AND METHOD FOR TRANSMITTING AND RECEIVING SIGNALS ON MULTIPLE BANDS IN WIRELESS COMMUNICATION SYSTEM

(71) Applicant: Samsung Electronics Co., Ltd., Suwon-si (KR)

(72) Inventors: Jeongho Lee, Suwon-si (KR);
Byungjoon Park, Suwon-si (KR);
Daehyun Kang, Suwon-si (KR);
Donghyun Lee, Suwon-si (KR);
Jooseok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/072,512

(22) Filed: Oct. 16, 2020

(65) Prior Publication Data

US 2021/0119662 A1 Apr. 22, 2021

(30) Foreign Application Priority Data

Oct. 17, 2019 (KR) ........................ 10-2019-0129116

(51) Int. Cl.
*H04B 1/38* (2015.01)
*H04B 1/40* (2015.01)
(Continued)

(52) U.S. Cl.
CPC ............. *H04B 1/40* (2013.01); *H04B 1/0053* (2013.01); *H04B 1/0071* (2013.01); *H04B 7/0617* (2013.01)

(58) Field of Classification Search
CPC .... H04B 1/38; H04B 2001/3811; H04B 1/40; H04B 1/02; H04B 1/04; H04B 2001/0408;
(Continued)

(56) References Cited

U.S. PATENT DOCUMENTS 7,180,467 B2   2/2007 Fabrega-Sanchez et al.
7,519,390 B2   4/2009 Malone et al.
(Continued)

OTHER PUBLICATIONS

International Search Report dated Feb. 2, 2021, issued in International Application No. PCT/KR2020/014182.
(Continued)

*Primary Examiner* — Tuan Pham
(74) *Attorney, Agent, or Firm* — Jefferson IP Law, LLP

(57) ABSTRACT

A transceiver in a wireless communication system is provided. The transceiver includes a first circuit configured to convert a digital signal having a third bandwidth, a second circuit configured to separate the analog signal into a first analog signal corresponding to the first band and a second analog signal corresponding to the second band, up-convert the first analog signal and the second analog signal to generate a first radio frequency (RF) signal in the first band and a second RF signal in the second band, and output an RF signal having the third bandwidth, and a third circuit configured to separate the RF signal into the first RF signal and the second RF signal, adjust a phase of the first RF signal for beamforming in the first band, and adjust a phase of the second RF signal for beamforming in the second band.

12 Claims, 18 Drawing Sheets

(51) Int. Cl.
  *H04B 7/06* (2006.01)
  *H04B 1/00* (2006.01)
(58) Field of Classification Search
  CPC .... H04B 1/0083; H04B 1/0053; H04B 1/005; H04B 1/0071
  See application file for complete search history.

(56) References Cited

U.S. PATENT DOCUMENTS

| | | |
|---|---|---|
| 10,334,601 B2 | 6/2019 | Chen et al. |
| 2012/0280840 A1 | 11/2012 | Kyeong et al. |
| 2014/0348263 A1* | 11/2014 | Rollins .................... H03F 3/24 |
| | | 375/297 |
| 2016/0013820 A1 | 1/2016 | Yamanouchi |
| 2016/0065263 A1 | 3/2016 | Lin et al. |
| 2016/0329953 A1 | 11/2016 | Smart et al. |
| 2017/0288828 A1 | 10/2017 | Liu et al. |
| 2018/0316383 A1 | 11/2018 | Kamgaing et al. |
| 2020/0235902 A1* | 7/2020 | Montalvo ................. H04L 5/14 |

OTHER PUBLICATIONS

Written Opinion dated Feb. 2, 2021, issued in International Application No. PCT/KR2020/014182.

* cited by examiner

APPARATUS AND METHOD FOR TRANSMITTING AND RECEIVING SIGNALS ON MULTIPLE BANDS IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0129116, filed on Oct. 17, 2019, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for transmitting and receiving signals in a plurality of bands in a wireless communication system.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency millimeter wave (mmWave) band (e.g., 28 GHz or 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beamforming, and large scale antenna techniques.

In addition, for network enhancement of the system, the 5G communication system is developing techniques, such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is working on hybrid frequency shift keying and quadrature amplitude modulation (FQAM) and sliding window superposition coding (SWSC) as advanced coding modulation (ACM) schemes, and filter bank multi carrier (FBMC), non-orthogonal multiple access (NOMA), and sparse code multiple access (SCMA) as advanced access technologies.

5G systems each have multiple usable bands defined therein. A network operator may operate a 5G system in at least one band. In the case where communication services are provided using a plurality of bands, signals may be required to be simultaneously transmitted or received through a plurality of bands. In this case, a transmission/reception method for effectively processing signals is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for supporting a plurality of bands in a wireless communication system.

Another aspect of the disclosure is to provide an apparatus and a method for simultaneously transmitting or receiving signals in a plurality of bands in a wireless communication system.

Additional aspects will be set forth in part in the description which follows and, in part, will be apparent from the description, or may be learned by practice of the presented embodiments.

In accordance with an aspect of the disclosure, a transceiver in a wireless communication system is provided. The transceiver includes a first circuit configured to convert a digital signal having a third bandwidth, which includes a first digital signal having a first bandwidth corresponding to a first band and a second digital signal having a second bandwidth corresponding to a second band, into an analog signal, a second circuit configured to separate the analog signal into a first analog signal corresponding to the first band and a second analog signal corresponding to the second band, up-convert the first analog signal and the second analog signal to generate a first radio frequency (RF) signal in the first band and a second RF signal in the second band, and output an RF signal having the third bandwidth, which includes the first RF signal and the second RF signal, and a third circuit configured to separate the RF signal into the first RF signal and the second RF signal, adjust a phase of the first RF signal for beamforming in the first band, and adjust a phase of the second RF signal for beamforming in the second band.

In accordance with another aspect of the disclosure, a signal processing device for a transceiver in a wireless communication system is provided. The signal processing device includes a conversion circuit configured to convert a digital signal having a third bandwidth, which includes a first digital signal having a first bandwidth corresponding to a first band and a second digital signal having a second bandwidth corresponding to a second band, into an analog signal.

In accordance with another aspect of the disclosure, a signal processing device for a transceiver in a wireless communication system is provided. The signal processing device includes a separator configured to separate an analog signal having a third bandwidth into a first analog signal having a first bandwidth corresponding to a first band and a second analog signal having a second bandwidth corresponding to a second band, mixers configured to up-convert the first analog signal and the second analog signal to generate a first RF signal in the first band and a second RF signal in the second band, and a combiner configured to generate an RF signal having the third bandwidth, which includes the first RF signal and the second RF signal.

In accordance with another aspect of the disclosure, a signal processing device for a transceiver in a wireless communication system is provided. The signal processing device includes a separator configured to separate an RF signal having a third bandwidth into a first RF signal having a first bandwidth corresponding to a first band and a second RF signal having a second bandwidth corresponding to a second band, and a phase shifter configured to adjust the phase of the first RF signal for beamforming in the first band and adjust the phase of the second RF signal for beamforming in the second band.

In accordance with another aspect of the disclosure, a method of operating a transceiver in a wireless communication system is provided. The method includes converting a digital signal having a third bandwidth, which includes a first digital signal having a first bandwidth corresponding to a first band and a second digital signal having a second bandwidth corresponding to a second band, into an analog signal, separating the analog signal into a first analog signal corresponding to the first band and a second analog signal corresponding to the second band, up-converting the first analog signal and the second analog signal to generate a first RF signal in the first band and a second RF signal in the second band, separating the RF signal having the third bandwidth, which includes the first RF signal and the second RF signal, into the first RF signal and the second RF signal, adjusting the phase of the first RF signal for beamforming in the first band, and adjusting the phase of the second RF signal for beamforming in the second band.

An apparatus and a method according to various embodiments make it possible to reduce the size of a circuit necessary for transmission and reception of signals through a plurality of bands.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
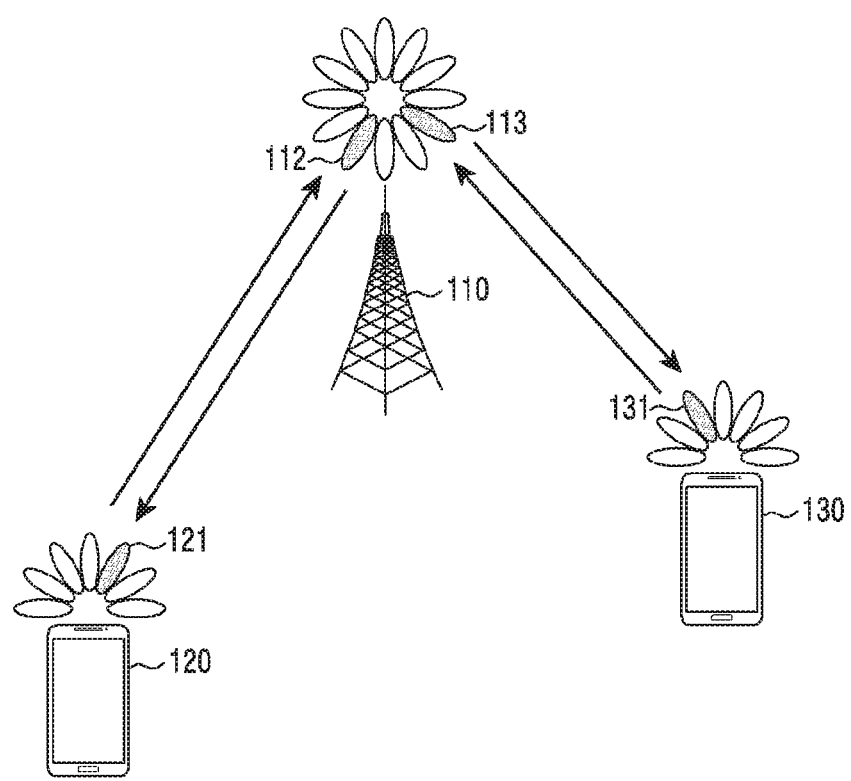
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

The disclosure relates to an apparatus and a method for transmitting and receiving signals in a plurality of bands in a wireless communication system. Specifically, the disclosure describes a technique for simultaneously transmitting or receiving signals through a plurality of bands in a wireless communication system.

In the following description, terms referring to signals, terms referring to channels, terms referring to control information, terms referring to network entities, terms referring to elements of an apparatus, and the like, which are used herein, are illustrative examples for convenience of description. Therefore, the disclosure is not limited to the terms to be described later, and other terms having equivalent technical meanings may be used.

In the following description, the terms "physical channel" and "signal" may be used interchangeably with "data" or "control signal". For example, a physical downlink shared channel (PDSCH) is a term that refers to a physical channel through which data is transmitted, but the PDSCH may also be used to indicate data. For example, in the disclosure, the expression "transmitting a physical channel" may be interpreted as "transmitting data or signals through a physical channel".

In the disclosure, upper layer signalling refers to a method of transmitting a signal from a base station to a terminal using a downlink data channel of a physical layer or transmitting a signal from a terminal to a base station using an uplink data channel of a physical layer. Upper layer signalling may be understood as radio resource control (RRC) signalling or a media access control (MAC) control element (CE).

In addition, in the disclosure, where the expression "greater than" or "less than" is used in order to determine whether or not a specific condition is satisfied or fulfilled, this is only exemplary and does not exclude the expression "equal to or greater than" or "equal to or less than". The expression "equal to or greater than" may be replaced with "greater than", the expression "equal to or less than" may be replaced with "less than", and the expression "equal to or greater than and less than" may be replaced with "greater than and equal to or less than" in the conditions above.

Further, the disclosure will describe various embodiments using terms used in some communication standards {e.g., 3rd generation partnership project (3GPP)}, but this is only exemplary for description. Various embodiments may be easily modified and applied to other communication systems.

FIG. 1 illustrates a wireless communication system according to an embodiment of the disclosure.

Referring to FIG. 1, it shows a base station 110, a terminal 120, and a terminal 130 as some of nodes using wireless channels in a wireless communication system. Although FIG. 1 shows only one base station, another base station that is the same as or similar to the base station 110 may be further included.

The base station 110 is network infrastructure that provides the terminals 120 and 130 with a wireless connection. The base station 110 has coverage, which is defined as a specific geographical area, based on the distance over which the base station 110 is able to transmit signals. The base station 110 may be referred to, in addition to "base station", as an "access point (AP)", an "eNodeB (eNB)", a "5th-generation (5G) node", a "next-generation NodeB (gNB)", a "wireless point", a "transmission/reception point (TRP)", or another term having an equivalent technical meaning.

Each of the terminal 120 and the terminal 130 is a device used by a user and performs communication with the base station 110 through a wireless channel. In some cases, at least one of the terminal 120 and the terminal 130 may be operated without involvement of a user. For example, at least one of the terminal 120 and the terminal 130 is a device that performs machine-type communication (MTC), and may not be carried by a user. Each of the terminal 140 and the terminal 130 may be referred to as, in addition to "terminal", "user equipment (UE)", a "mobile station", a "subscriber station", a "remote terminal", a "wireless terminal", a "user device", or another term having an equivalent technical meaning.

The base station 110, the terminal 120, and the terminal 130 may transmit and receive wireless signals in a millimeter wave (mmWave) band (e.g., 28 GHz, 30 GHz, 38 GHz, or 60 GHz). In this case, in order to improve the channel gain, the base station 110, the terminal 120, and the terminal 130 may perform beamforming. Here, beamforming may include transmission beamforming and reception beamforming. For example, the base station 110, the terminal 120, and the terminal 130 may impart directivity to a transmission signal or a reception signal. To this end, the base station 110 and the terminals 120 and 130 may select serving beams 112, 113, 121, and 131 through a beam searching or management procedure. After the serving beams 112, 113, 121, and 131 are selected, subsequent communication may be performed through a resource in a quasi-co-located (QCL) relationship with the resource that transmitted the serving beams 112, 113, 121, and 131.

If the large-scale characteristics of the channel that carried symbols on the first antenna port can be inferred from the channel that carried symbols on the second antenna port, it can be determined that the first antenna port and the second antenna port have a QCL relationship therebetween. For example, the large-scale characteristics may include at least one of a delay spread, a Doppler spread, a Doppler shift, an average gain, an average delay, and spatial receiver parameters.

Figure 2:
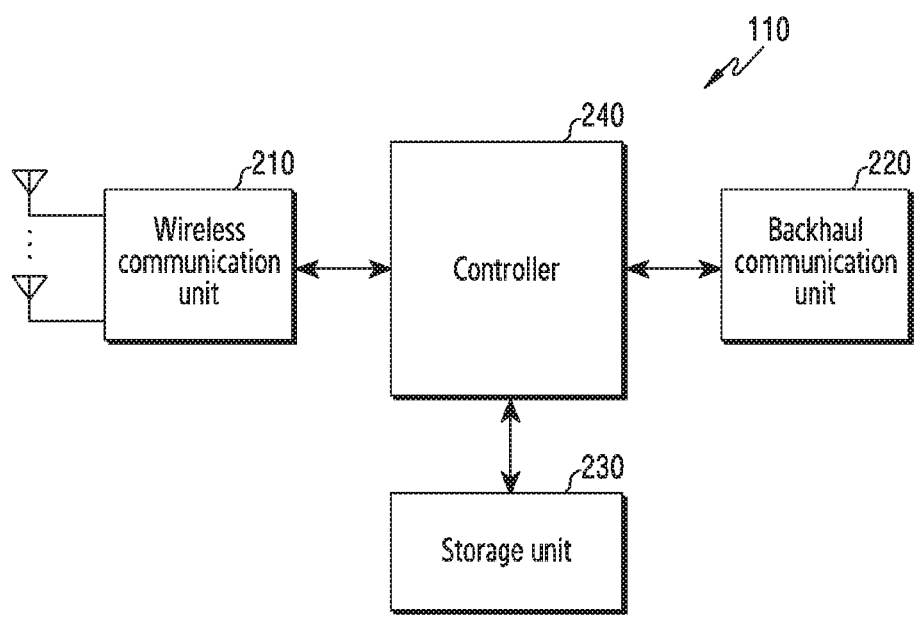
FIG. 2 illustrates a configuration of a base station in a wireless communication system according to an embodiment of the disclosure.

FIG. 2 illustrates a configuration of a base station in a wireless communication system according to an embodiment of the disclosure. The configuration illustrated in FIG. 2 may be understood as the configuration of the base station 110. Hereinafter, the term "-unit", "-or (er)", or the like denotes a unit for processing at least one function or operation, and may be implemented as hardware, software, or a combination thereof.

Referring to FIG. 2, the base station includes a wireless communication unit 210, a backhaul communication unit 220, a storage unit 230, and a controller 240.

The wireless communication unit 210 performs functions of transmitting and receiving signals through a wireless channel. For example, the wireless communication unit 210 performs conversion between a baseband signal and a bit string according to the physical layer standard of the system. For example, when transmitting data, the wireless communication unit 210 generates complex symbols by encoding and modulating a transmission bit string. In addition, when receiving data, the wireless communication unit 210 restores a received bit string through demodulation and decoding of the baseband signal.

For example, the wireless communication unit 210 up-converts a baseband signal into a radio frequency (RF) band signal to thus transmit the same through an antenna, and down-converts an RF band signal received through the antenna into a baseband signal. To this end, the wireless communication unit 210 may include a transmission filter, a reception filter, an amplifier, a mixer, an oscillator, a digital-to-analog convertor (DAC), an analog-to-digital convertor (ADC), and the like. In addition, the wireless communication unit 210 may include a plurality of transmission/ reception paths. Further, the wireless communication unit 210 may include at least one antenna array including a plurality of antenna elements.

In terms of hardware, the wireless communication unit 210 may be configured as a digital unit and an analog unit, and the analog unit may include a plurality of sub-units according to operation power, operation frequency, or the like. The digital unit may be implemented as at least one processor {e.g., a digital signal processor (DSP)}.

The wireless communication unit 210 transmits and receives signals as described above. Accordingly, all or part of the wireless communication unit 210 may be referred to as a "transmitter", a "receiver", or a "transceiver". In addition, in the following description, transmission and reception performed through a wireless channel will be understood to encompass the operations performed by the wireless communication unit 210 as described above.

The backhaul communication unit 220 provides an interface for performing communication with other nodes in the network. For example, the backhaul communication unit 220 converts a bit string, transmitted from the base station to another node, such as another access node, another base station, an upper layer node, a core network, or the like, into a physical signal, and converts physical signals received from other nodes into bit strings.

The storage unit 230 stores data, such as basic programs, application programs, and configuration information for the operation of the base station. The storage unit 230 may be configured as a volatile memory, a non-volatile memory, or a combination thereof. In addition, the storage unit 230 provides the stored data in response to a request from the controller 240.

The controller 240 controls the overall operation of the base station. For example, the controller 240 transmits and receives signals through the wireless communication unit 210 or the backhaul communication unit 220. In addition, the controller 240 records and reads data in and from the storage unit 230. In addition, the controller 240 may perform functions of a protocol stack required for the communication standard. According to another embodiment of the disclosure, the protocol stack may be included in the wireless communication unit 210. To this end, the controller 240 may include at least one processor. According to various embodiments of the disclosure, the controller 240 may control the base station to perform operations according to various embodiments to be described later.

Figure 3:
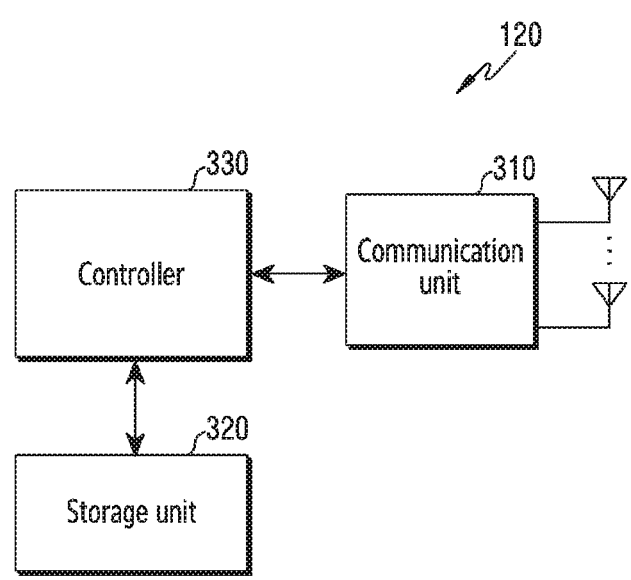
FIG. 3 illustrates a configuration of a terminal in a wireless communication system according to an embodiment of the disclosure.

FIG. 3 illustrates a configuration of a terminal in a wireless communication system according to an embodiment of the disclosure. The configuration illustrated in FIG. 3 may be understood as the configuration of the terminal 120. Hereinafter, the term "-unit", "-or (er)", or the like denotes a unit for processing at least one function or operation, and may be implemented as hardware, software, or a combination thereof.

Referring to FIG. 3, the terminal includes a communication unit 310, a storage unit 320, and a controller 330.

The communication unit 310 performs functions of transmitting and receiving signals through a wireless channel. For example, the communication unit 310 performs conversion between a baseband signal and a bit string according to the physical layer standard of the system. For example, when transmitting data, the communication unit 310 generates complex symbols by encoding and modulating a transmission bit string. In addition, when receiving data, the communication unit 310 restores the received bit string through demodulation and decoding of the baseband signal. In addition, the communication unit 310 up-converts a baseband signal into an RF band signal to thus transmit the same through an antenna, and down-converts an RF band signal received through the antenna into a baseband signal. To this end, the communication unit 310 may include a transmission filter, a reception filter, an amplifier, a mixer, an oscillator, a DAC, an ADC, and the like.

In addition, the communication unit 310 may include a plurality of transmission/reception paths. Further, the communication unit 310 may include at least one antenna array including a plurality of antenna elements. In terms of hardware, the communication unit 310 may be configured as a digital circuit and an analog circuit {e.g., a radio frequency integrated circuit (RFIC)}. The digital circuit and the analog circuit may be implemented as a single package. In addition, the communication unit 310 may include a plurality of RF chains. Furthermore, the communication unit 310 may perform beamforming.

The communication unit 310 transmits and receives signals as described above. Accordingly, all or part of the communication unit 310 may be referred to as a "transmitter", a "receiver", or a "transceiver". In addition, in the following description, transmission and reception performed through a wireless channel will be understood to encompass the operations performed by the communication unit 310 as described above.

The storage unit 320 stores data, such as basic programs, application programs, and configuration information for the operation of the terminal. The storage unit 320 may be configured as a volatile memory, a non-volatile memory, or a combination thereof. In addition, the storage unit 320 provides the stored data in response to a request from the controller 330.

The controller 330 controls the overall operation of the base station. For example, the controller 330 transmits and receives signals through the communication unit 310. In addition, the controller 330 records and reads data in and from the storage unit 320. In addition, the controller 330 may perform functions of a protocol stack required for the communication standard. To this end, the controller 330 may include at least one processor or a micro-processor, or may be a part of a processor. In addition, part of the communication unit 310 and the controller 330 may be referred to as a "communication processor (CP)". According to various embodiments of the disclosure, the controller 330 may control the terminal to perform operations according to various embodiments described later.

Figure 4:
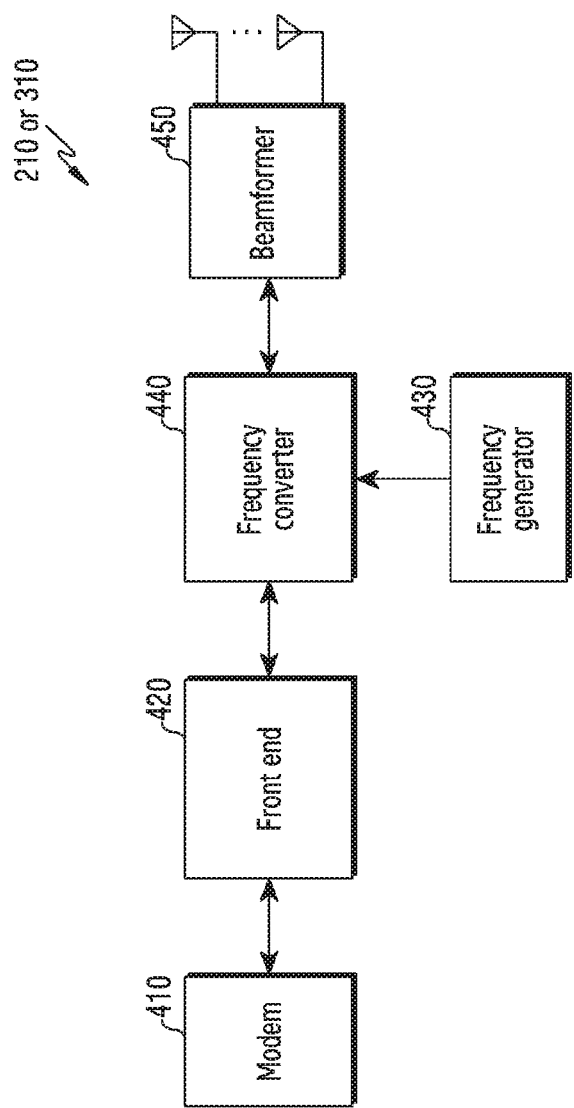
FIG. 4 illustrates a configuration of a communication unit in a wireless communication system according to an embodiment of the disclosure.

FIG. 4 illustrates a configuration of a communication unit in a wireless communication system according to an embodiment of the disclosure. FIG. 4 shows an example of the detailed configuration of the wireless communication unit 210 in FIG. 2 or the communication unit 310 in FIG. 3.

Referring to FIG. 4, the communication unit includes a modem 410, a front end 420, a frequency generator 430, a frequency converter 440, and a beamformer 450.

The modem 410 generates a digital baseband signal by channel-encoding and modulating transmission bits. Alternatively, the modem 410 restores reception bits by demodulating and channel-decoding a digital baseband signal. For example, in the case where signals are simultaneously transmitted through a plurality of bands, the modem 410 may generate a baseband signal including signals corresponding to the respective bands.

The front end 420 converts the baseband signal generated by the modem 410 into an analog signal. Alternatively, the front end 420 converts an analog signal provided from the frequency converter 440 into a digital signal. In this case, the front end 420 may have broadband characteristics capable of processing a broadband signal including signals transmitted or received through a plurality of bands. The broadband signal indicates a signal having a bandwidth equal to or greater than the sum of the bandwidths of two or more bands. The front end 420 may be referred to as a "digital-analog front end (DAFE)".

The frequency generator 430 generates at least one frequency signal (e.g., a sine-wave signal) for a frequency conversion operation of the frequency converter 440. The frequency generator 430 may generate a plurality of frequency signals corresponding to a plurality of bands supported by the communication unit. The number of frequency signals output from the frequency generator 430 may vary depending on the number of bands currently used for communication.

The frequency converter 440 up-converts the signal provided from the front end 420 to an RF signal in a corresponding band. Alternatively, the frequency converter 440 down-converts the RF signal provided from the beamformer 450. In the case where a plurality of bands is simultaneously used, the frequency converter 440 may separate a provided broadband signal into band-specific signals, may convert the frequencies thereof, and may combine the frequency-converted signals into a broadband signal.

The beamformer 450 performs transmission beamforming on the signal provided from the frequency converter 440 and reception beamforming on the signal received through the antenna. In the case where a plurality of bands is simultaneously used, the beamformer 450 may perform an operation of shifting the phases of the signals, an operation of amplifying the signals, an operation of separating the broadband signal into band-specific signals, and an operation of combining the band-specific signals into a broadband signal.

All of the elements illustrated in FIG. 4 may be implemented as separate integrated circuit (IC) chips. Alternatively, two or more of the elements illustrated in FIG. 4 may be implemented as a single IC chip.

The structure illustrated in FIG. 4 may be used to process signals in two or more bands. Two chains may be used to process signals in two or more bands. According to various embodiments of the disclosure, at least one of a series of components included in the two chains may be configured to process signals belonging to two bands by a single operation. To this end, an element for separating one signal into signals for the respective bands and an element for combining signals into one signal may be included.

A plurality of bands may be supported using the structure described with reference to FIG. 4. Since a plurality of bands is processed as a single broadband signal in at least one of a series of signal processing operations, they may be treated as a single signal. To this end, the baseband signal generated by the modem 410 may be configured as shown in FIG. 5 below.

Figure 5:
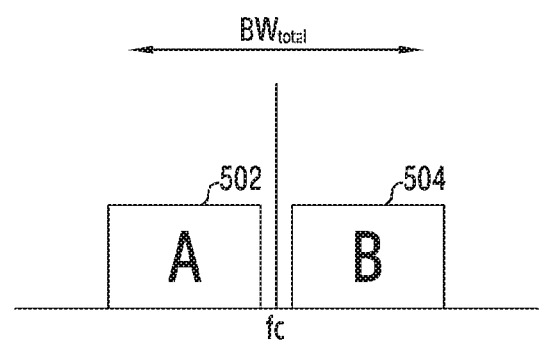
FIG. 5 illustrates a baseband signal transmitted or received through a plurality of bands in a wireless communication system according to an embodiment of the disclosure.

FIG. 5 illustrates a baseband signal transmitted or received through a plurality of bands in a wireless communication system according to an embodiment of the disclosure. FIG. 5 illustrates a broadband baseband signal in the case of transmitting signals through two bands.

Referring to FIG. 5, the broadband baseband signal includes a band-A signal 502 and a band-B signal 504, and has a bandwidth $BW_{total}$. The bandwidth $BW_{total}$ is greater than or equal to the sum of the bandwidth BWA of the band-A signal 502, the bandwidth BWB of the band-B signal 504, and the size of a guard band. The size of the guard band may vary depending on the performance of the filter used to separate the broadband signal into band-specific signals. The offset, which is the difference between the center frequency $f_A$ of the band-A signal 502 and the center frequency fB of the band-B signal 504, is greater than half the sum of the bandwidth $BW_A$ of the band-A signal 502 and the bandwidth BWB of the band-B signal 504 ($=BW_A/2+BW_B/2$). Since the broadband signal has the bandwidth $BW_{total}$, the front end 420 and the frequency converter 440 are required to be capable of processing a signal having a bandwidth of $BW_{total}$ or more.

The baseband signal illustrated in FIG. 5 may be understood as an intermediate frequency (IF) signal. According to an embodiment of the disclosure, the IF signal may be generated by the front end 420. In this case, for example, $f_A$ may be 9.26 GHz, $f_B$ may be 10.25 GHz, the center frequency $f_c$ of the broadband signal may be 9.75 GHz, $BW_A$ may be 900 MHz, $BW_B$ may be 900 MHz, and the offset may be 1 GHz.

Hereinafter, the disclosure describes the structures of the respective elements of the communication unit. The structures described below with reference to FIGS. 6, 7A, 7B, 8A to 8C, 9A, and 9B be capable of processing two bands. However, it is obvious that the disclosure can be easily extended to a circuit having the ability to process three or more bands.

Figure 6:
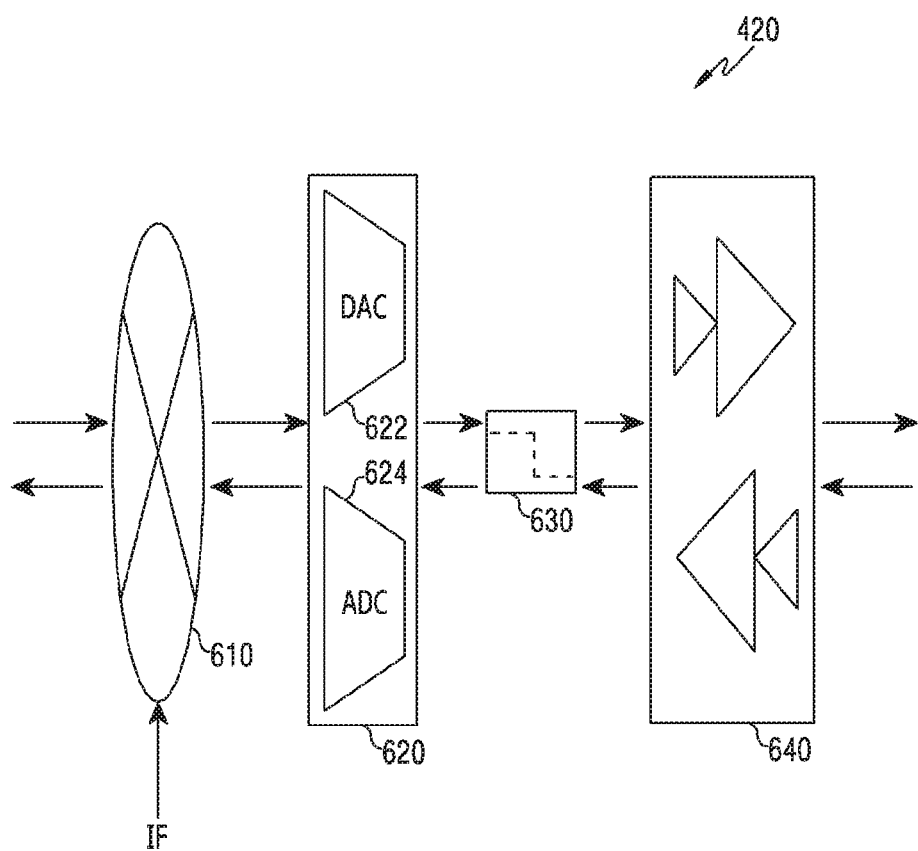
FIG. 6 illustrates a configuration of a front end in a wireless communication system according to an embodiment of the disclosure.

FIG. 6 illustrates a configuration of a front end in a wireless communication system according to an embodiment of the disclosure.

Referring to FIG. 6, the front end 420 includes a mixer 610, a conversion circuit 620, a filter 630, and an amplifier circuit 640.

The mixer 610 performs frequency up/down-conversion between a baseband signal and an IF signal. To this end, the mixer 610 may receive a frequency signal in an IF band from an oscillator (not shown). The mixer 610 has broadband characteristics capable of processing a broadband signal including a plurality of bands. The conversion circuit 620 includes a DAC 622 for converting a transmission signal and an ADC 624 for converting a reception signal. Each of the DAC 622 and ADC 624 has broadband characteristics capable of processing a broadband signal including a plurality of bands. The filter 630 removes unnecessary frequency components from the IF signal. The amplifier circuit 640 amplifies a transmission signal or a reception signal. To this end, the amplifier circuit 640 may include a power amplifier (PA) or a low-noise amplifier (LNA). The amplifier circuit 640 has broadband characteristics capable of processing a broadband signal including a plurality of bands.

Figure 7A:
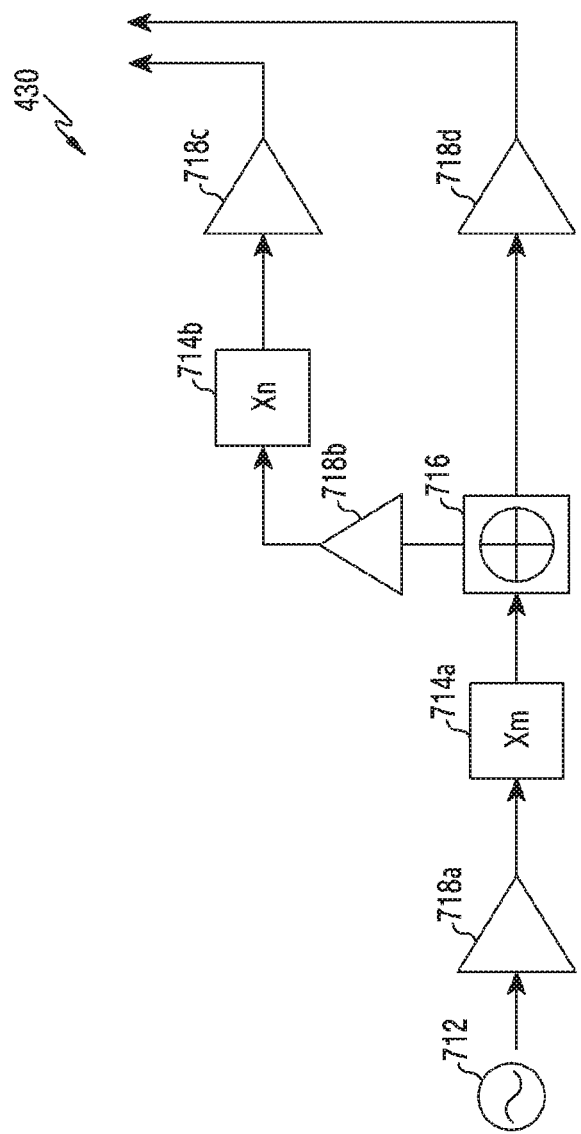
FIG. 7A illustrates a configuration of a frequency generator in a wireless communication system according to an embodiment of the disclosure.

FIG. 7A illustrates a configuration of a frequency generator in a wireless communication system according to an embodiment of the disclosure. FIG. 7A illustrates the case in which a single local oscillator (LO) is used.

Referring to FIG. 7A, the frequency generator 430 includes an LO 712, a first multiplier 714a, a second multiplier 714b, a separator 716, a first amplifier 718a, a second amplifier 718b, a third amplifier 718c, and a fourth amplifier 718d.

The LO 712 generates a basic frequency signal. The frequency signal is amplified by the first amplifier 718a and is converted into an m-fold frequency signal by the first multiplier 714a. The frequency signal is provided through two paths by the separator 716. The signal provided through a first path is amplified by the second amplifier 718b, is converted into an n-fold frequency signal by the second multiplier 714b, and is then amplified by the third amplifier 718c. The signal provided through a second path is amplified by the fourth amplifier 718d.

Accordingly, the frequency signal output through the first path has a frequency, which corresponds to a first band and is m×n times the basic frequency, and the frequency signal output through the second path has a frequency, which corresponds to a second band and is m times the basic frequency. For example, when m=3 and n=2, the basic frequency may be 4.875 GHz, the frequency of the signal output through the first path may be 29.26 GHz, and the frequency of the signal output through the second path may be 14.625 GHz.

Figure 7B:
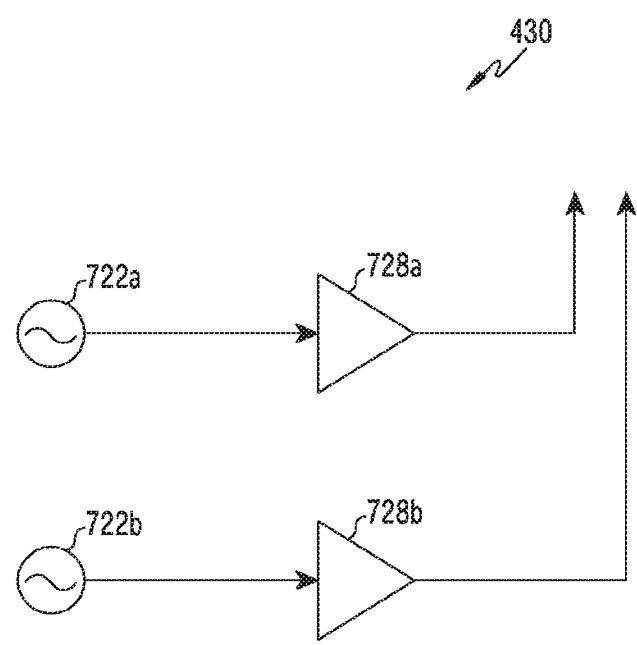
FIG. 7B illustrates a configuration of a frequency generator in a wireless communication system according to an embodiment of the disclosure.

FIG. 7B illustrates a configuration of a frequency generator in a wireless communication system according to an embodiment of the disclosure. FIG. 7B illustrates the case in which different LOs are used for respective bands.

Referring to FIG. 7B, the frequency generator 430 may include a first LO 722a, a second LO 722b, a first amplifier 728a, and a second amplifier 728b. The first LO 722a generates a signal having a frequency corresponding to a first band, and the second LO 722b generates a signal having a frequency corresponding to a second band. The first amplifier 728a amplifies the signal having a frequency corresponding to the first band, and the second amplifier 728b amplifies the signal having a frequency corresponding to the second band. Although not shown in FIG. 7B, according to another embodiment of the disclosure, each path may further include at least one multiplier.

Figure 8A:
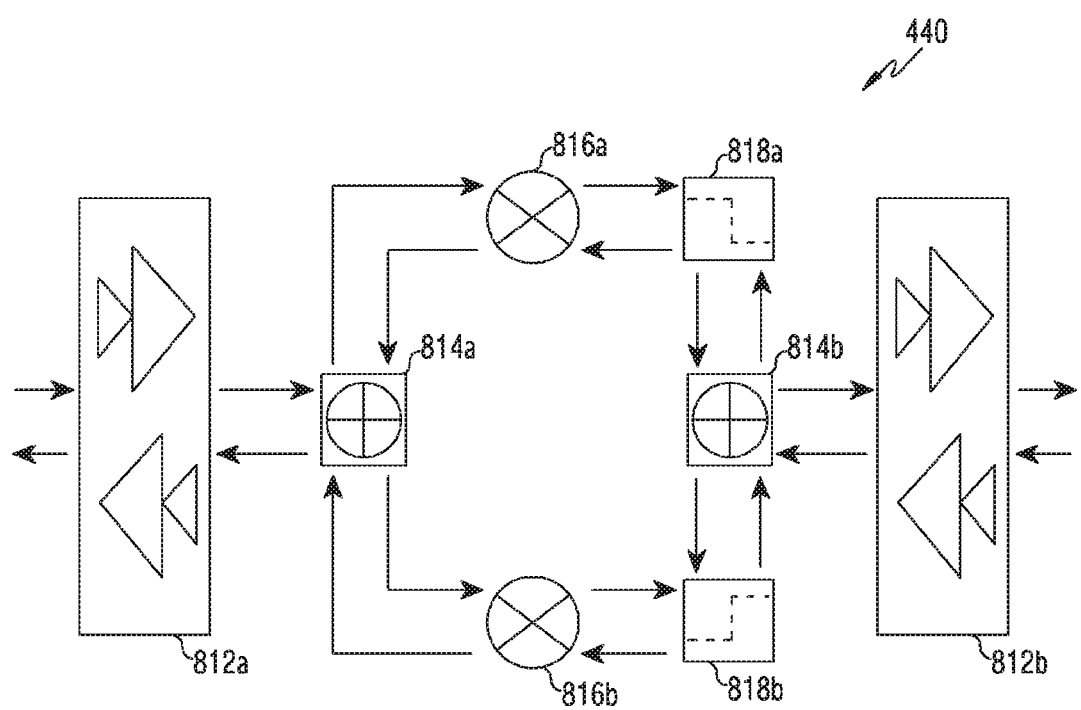
FIG. 8A illustrates a configuration of a frequency converter in a wireless communication system according to an embodiment of the disclosure.

FIG. 8A illustrates a configuration of a frequency converter in a wireless communication system according to an embodiment of the disclosure.

Referring to FIG. 8A, the frequency converter 440 includes a first amplifier circuit 812a, a second amplifier circuit 812b, a first frequency combiner/separator 814a, a second frequency combiner/separator 814b, a first mixer 816a, a second mixer 816b, a first filter 818a, and a second filter 818b.

The first amplifier circuit 812a amplifies an IF signal. To this end, the first amplifier circuit 812a may include a PA and an LNA. The first amplifier circuit 812a has broadband characteristics capable of processing a broadband signal including IF signals corresponding to a plurality of bands. The second amplifier circuit 812b amplifies an RF signal. To this end, the second amplifier circuit 812b may include a PA and an LNA. The second amplifier circuit 812b has broadband characteristics capable of processing a broadband signal including RF signals in a plurality of bands. In this case, since the broadband signal amplified by the second amplifier circuit 812b includes signals of bands that transmit the RF signals, the offset between the signals may be greater than the offset between the signals amplified by the first amplifier circuit 812a due to the up-conversion operation by the first and second mixers 816a and 816b.

In this case, the second amplifier circuit 812b may have wider broadband characteristics than the first amplifier circuit 812a.

The first frequency combiner/separator 814a separates a broadband IF signal into two IF signals, or combines two IF signals into a broadband IF signal. In this case, the two IF signals include a low-band (LB) signal and a high-band (HB) signal, which are separated from a broadband IF signal based on a specific frequency (e.g., a center frequency). The second frequency combiner/separator 814b separates a broadband RF signal into two band-specific RF signals, or combines two band-specific RF signals into a broadband RF signal. In this case, the two RF signals include an LB signal and an HB signal, which are separated from a broadband RF signal based on a specific frequency (e.g., a center frequency).

The first mixer 816a performs frequency up/down-conversion between the RF signal and the IF signal in the first band. To this end, the first mixer 816a uses a frequency signal corresponding to the first band, which is provided from the frequency generator 430. The second mixer 816b performs frequency up/down-conversion between the RF signal and the IF signal in the second band. To this end, the second mixer 816b uses a frequency signal corresponding to the second band, which is provided from the frequency generator 430.

The first filter 818a removes unnecessary components, except the RF signal in the first band, from the signal that is up-converted by the first mixer 816a or from the LB signal separated by the second frequency combiner/separator 814b. The first filter 818a may be a low-pass filter (LPF). The second filter 818b removes unnecessary components, except the RF signal in the second band, from the signal that is up-converted by the second mixer 816b or from the HB signal separated by the second frequency combiner/separator 814b. The second filter 818b may be a high-pass filter (HPF).

When transmitting a signal in the structure shown in FIG. 8A, the IF signal provided from the front end 420 is amplified by the first amplifier circuit 812a, and is then separated into an LB signal and an HB signal by the first frequency combiner/separator 814b. The LB signal and the HB signal provided to the respective paths are up-converted into RF signals by the first mixer 816a and the second mixer 816b, are filtered by the first filter 818a and the second filter 818b, and are then combined into a broadband RF signal by the second frequency combiner/separator 814b. Thereafter, the broadband RF signal is amplified by the second amplifier circuit 812b and is then provided to the beamformer 450.

When receiving a signal in the structure shown in FIG. 8A, the RF signal provided from the beamformer 450 is amplified by the second amplifier circuit 812b, and is separated into an LB signal and an HB signal by the second frequency combiner/separator 814b. The LB signal and the HB signal provided to the respective paths are filtered by the first filter 818a and the second filter 818b, are down-converted to IF signals by the first mixer 816a and the second mixer 816b, and are then combined into a broadband IF signal by the first frequency combiner/separator 814a. Thereafter, the broadband IF signal is amplified by the first amplifier circuit 812a and is then provided to the front end 420.

Figure 8B:
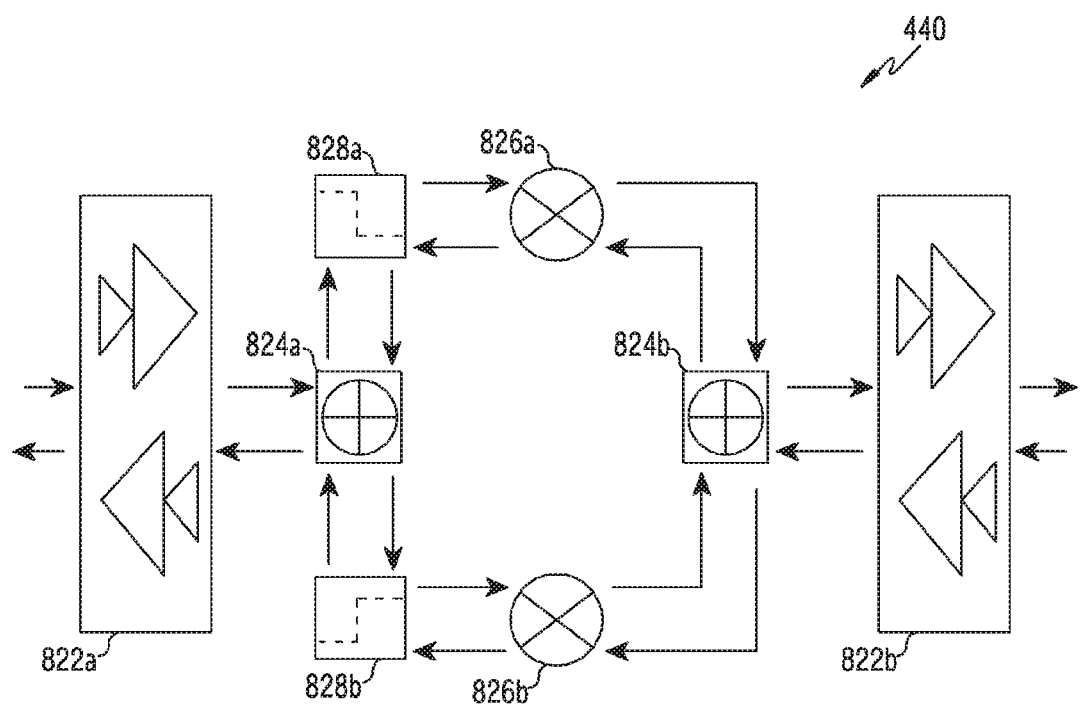
FIG. 8B illustrates a configuration of a frequency converter in a wireless communication system according to an embodiment of the disclosure.

FIG. 8B illustrates a configuration of a frequency converter in a wireless communication system according to an embodiment of the disclosure.

Referring to FIG. 8B, the frequency converter 440 includes a first amplifier circuit 822a, a second amplifier circuit 822b, a first frequency combiner/separator 824a, a second frequency combiner/separator 824b, a first mixer 826a, a second mixer 826b, a first filter 828a, and a second filter 828b.

The first amplifier circuit 822a amplifies an IF signal. To this end, the first amplifier circuit 822a may include a PA and an LNA. The first amplifier circuit 822a has broadband characteristics capable of processing a broadband signal including IF signals corresponding to a plurality of bands. The second amplifier circuit 822b amplifies an RF signal. To this end, the second amplifier circuit 822b may include a PA and an LNA. The second amplifier circuit 822b has broadband characteristics capable of processing a broadband signal including RF signals in a plurality of bands. In this case, since the broadband signal amplified by the second amplifier circuit 822b includes signals in bands that transmit the RF signals, the offset between the signals may be greater than the offset between the signals amplified by the first amplifier circuit 822*a* due to the up-conversion operation by the mixers 826*a* and 826*b*. In this case, the second amplifier circuit 822*b* may have wider broadband characteristics than the first amplifier circuit 822*a*.

The first frequency combiner/separator 824*a* separates a broadband IF signal into two IF signals, or combines two IF signals into a broadband IF signal. In this case, the two IF signals include an LB signal and an HB signal, which are separated from a broadband IF signal based on a specific frequency (e.g., a center frequency). The second frequency combiner/separator 824*b* separates a broadband RF signal into two band-specific RF signals, or combines two band-specific RF signals into a broadband RF signal. In this case, the two RF signals include an LB signal and an HB signal, which are separated from a broadband RF signal based on a specific frequency (e.g., a center frequency).

The first mixer 826*a* performs frequency up/down-conversion between the RF signal and the IF signal in the first band. To this end, the first mixer 826*a* uses a frequency signal corresponding to the first band, which is provided from the frequency generator 430. The second mixer 826*b* performs frequency up/down-conversion between the RF signal and the IF signal in the second band. To this end, the second mixer 826*b* uses a frequency signal corresponding to the second band, which is provided from the frequency generator 430.

The first filter 828*a* removes unnecessary components, except the IF signal corresponding to the first band, from the signal that is down-converted by the first mixer 826*a* or from the LB signal separated by the first frequency combiner/separator 824*a*. The first filter 828*a* may be an LPF. The second filter 828*b* removes unnecessary components, except the IF signal corresponding to the second band, from the signal that is down-converted by the second mixer 826*b* or from the HB signal separated by the first frequency combiner/separator 824*a*. The second filter 828*b* may be an HPF.

When transmitting a signal in the structure shown in FIG. 8B, the IF signal provided from the front end 420 is amplified by the first amplifier circuit 822*a*, and is then separated into an LB signal and an HB signal by the first frequency combiner/separator 824*a*. The LB signal and the HB signal provided to the respective paths are filtered by the first filter 828*a* and the second filter 828*b*, are up-converted into RF signals by the first mixer 826*a* and the second mixer 826*b*, and are then combined into a broadband RF signal by the second frequency combiner/separator 824*b*. Thereafter, the broadband RF signal is amplified by the second amplifier circuit 822*b* and is then provided to the beamformer 450.

When receiving a signal in the structure shown in FIG. 8B, the RF signal provided from the beamformer 450 is amplified by the second amplifier circuit 822*b*, and is separated into an LB signal and an HB signal by the second frequency combiner/separator 824*b*. The LB signal and the HB signal provided to the respective paths are down-converted into IF signals by the first mixer 826*a* and the second mixer 826*b*, are filtered by the first filter 828*a* and the second filter 828*b*, and are then combined into a broadband IF signal by the first frequency combiner/separator 824*a*. Thereafter, the broadband IF signal is amplified by the first amplifier circuit 822*a* and is then provided to the front end 420.

In the structures illustrated in FIGS. 8A and 8B, each path includes one mixer and one filter. According to another embodiment of the disclosure, each path may include one mixer and two filters. In this case, according to an embodiment of the disclosure, the two filters may be disposed at both ends of the mixer so as to filter the signal transmitted to the mixer and bypass the signal output from the mixer. According to another embodiment of the disclosure, the two filters may be disposed at both ends of the mixer so as to filter the signal output from the mixer and bypass the signal transmitted to the mixer. According to another embodiment of the disclosure, the two filters may be disposed at both ends of the mixer so as to filter both the signal output from the mixer and the signal transmitted to the mixer.

Figure 8C:
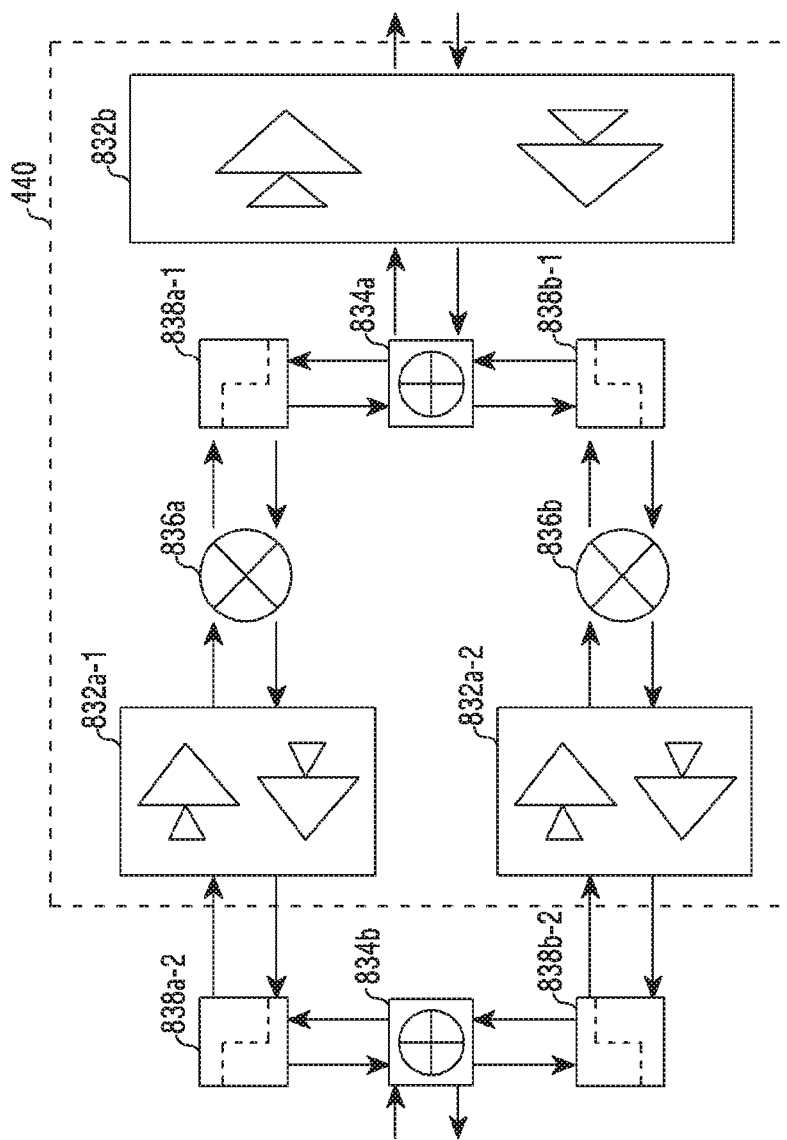
FIG. 8C illustrates a configuration of a frequency converter in a wireless communication system according to an embodiment of the disclosure.

FIG. 8C illustrates a configuration of a frequency converter in a wireless communication system according to an embodiment of the disclosure.

Referring to FIG. 8C, the frequency converter 440 includes a first-band amplifier circuit 832*a*-1, a second-band amplifier circuit 832*a*-2, a broadband amplifier circuit 832*b*, a frequency combiner/separator 834*a*, a first mixer 836*a*, a second mixer 836*b*, a first filter 838*a*-1, and a second filter 838*b*-1.

Referring to FIG. 8C, the first-band amplifier circuit 832*a*-1 amplifies an IF signal corresponding to a first band, and the second-band amplifier circuit 832*a*-2 amplifies an IF signal corresponding to a second band. To this end, each of the first-band amplifier circuit 832*a*-1 and the second-band amplifier circuit 832*a*-2 may include a PA and an LNA. The broadband amplifier circuit 832*b* amplifies an RF signal. To this end, the broadband amplifier circuit 832*b* may include a PA and an LNA. The broadband amplifier circuit 832*b* has broadband characteristics capable of processing a broadband signal including RF signals corresponding to a plurality of bands.

The frequency combiner/separator 834*a* separates a broadband RF signal into two RF signals, or combines two RF signals into a broadband RF signal. In this case, the two RF signals include an LB signal and an HB signal, which are separated from a broadband RF signal based on a specific frequency (e.g., a center frequency). The first mixer 836*a* performs frequency up/down-conversion between the RF signal and the IF signal in the first band. To this end, the first mixer 836*a* uses a frequency signal corresponding to the first band, which is provided from the frequency generator 430. The second mixer 836*b* performs frequency up/down-conversion between the RF signal and the IF signal in the second band. To this end, the second mixer 836*b* uses a frequency signal corresponding to the second band, which is provided from the frequency generator 430.

The first filter 838*a*-1 removes unnecessary components, except the RF signal in the first band, from the signal that is up-converted by the first mixer 836*a* or from the LB signal separated by the frequency combiner/separator 834*a*. The first filter 838*a*-1 may be a low-pass filter (LPF). The second filter 838*b*-1 removes unnecessary components, except the RF signal in the second band, from the signal that is up-converted by the second mixer 836*b* or from the HB signal separated by the frequency combiner/separator 834*a*. The second filter 838*b*-1 may be a high-pass filter (HPF).

In addition, in order to connect the front end 420 and the frequency converter 440, a frequency combiner/separator 834*b*, the first filter 838*a*-1, and the second filter 838*a*-2 may be disposed between the front end 420 and the frequency converter 440. The frequency combiner/separator 834*b* may separate the broadband IF signal provided from the front end 420 into band-specific IF signals, and each of the first filter 838*a*-1 and the second filter 838*a*-2 may filter the IF signal in the corresponding band. In addition, each of the first filter 838*a*-1 and the second filter 838*a*-2 may filter the IF signal in the corresponding band, and the frequency combiner/ separator 834*b* may combine the band-specific IF signals provided from the first filter 838*a*-1 and the second filter 838*a*-2 into a broadband IF signal.

When transmitting a signal in the structure shown in FIG. 8C, input band-specific IF signals (e.g., an HB signal and an LB signal) are amplified by the first-band amplifier circuit 832*a*-1 and the second-band amplifier circuit 832*a*-2, and the amplified LB and HB signals are up-converted into RF signals by the first mixer 826*a* and the second mixer 826*b*, are filtered by the first filter 838*a*-1 and the second filter 838*b*-1, and are then combined into a broadband RF signal by the frequency combiner/separator 834*b*. Thereafter, the broadband RF signal is amplified by the broadband amplifier circuit 832*b*, and is then provided to the beamformer 450.

When receiving a signal in the structure shown in FIG. 8C, the RF signal provided from the beamformer 450 is amplified by the broadband amplifier circuit 832*b*, and is separated into an LB signal and an HB signal by the frequency combiner/separator 834*b*. The LB signal and the HB signal provided to the respective paths are filtered by the first filter 838*a*-1 and the second filter 838*b*-1, and are down-converted into IF signals by the first mixer 826*a* and the second mixer 826*b*. Then, the band-specific IF signals are amplified by the first amplifier circuit 832*a*-1 and the second amplifier circuit 832*a*-2 and are then output.

In the structures described with reference to FIGS. 6, 7A, 7B, and 8A to 8C, a baseband signal is up-converted into an IF signal by the front end 420, and an IF signal is converted to an RF signal by the frequency converter 440. According to another embodiment of the disclosure, direct conversion from a baseband signal into an RF signal without conversion to an IF signal may be applied. In this case, the mixer 610 may be omitted from the front end 420, and the mixers 816*a*, 816*b*, 826*a*, and 826*b* of the frequency converter 440 may perform up/down-conversion between the baseband signal and the RF signal.

Figure 9A:
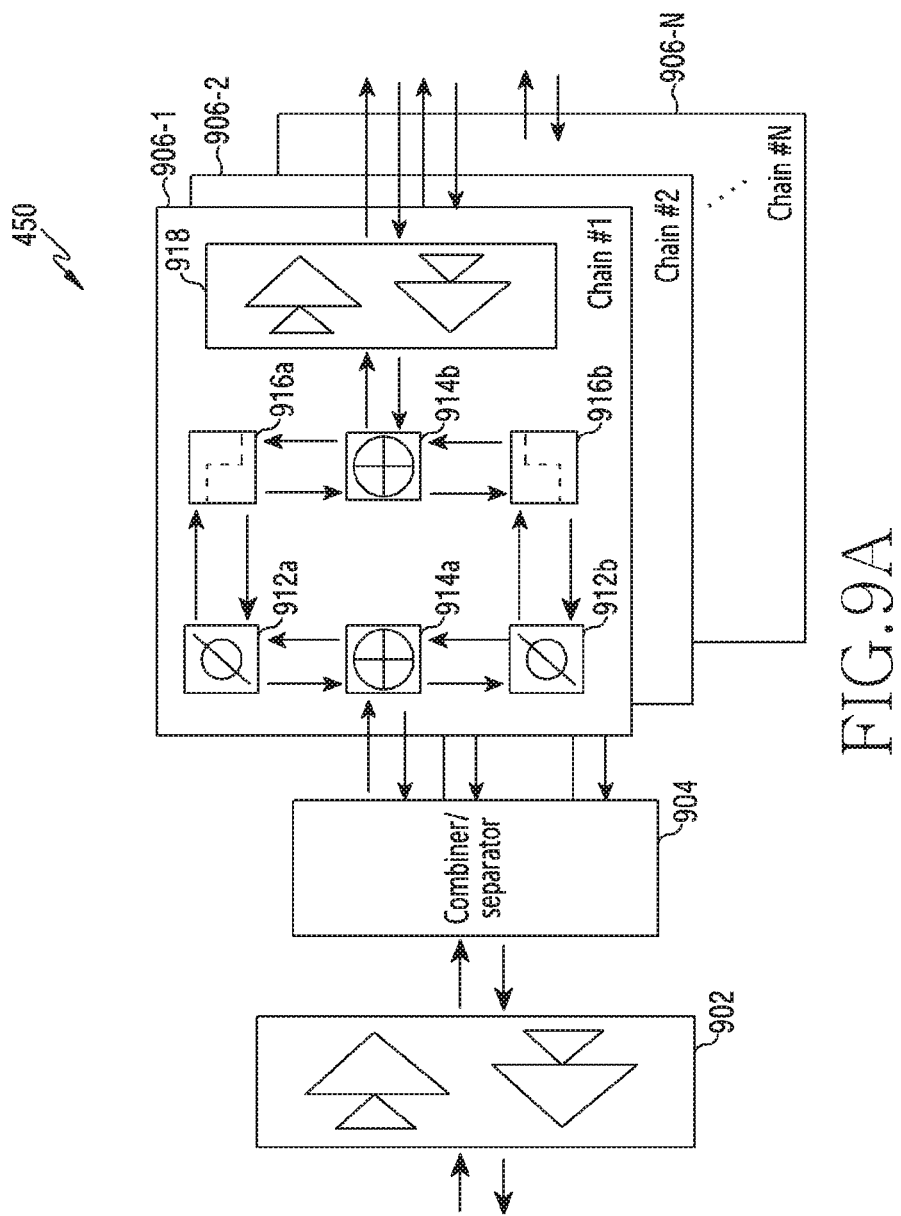
FIG. 9A illustrates a configuration of a beamformer in a wireless communication system according to an embodiment of the disclosure.

FIG. 9A illustrates a configuration of a beamformer in a wireless communication system according to an embodiment of the disclosure.

Referring to FIG. 9A, the beamformer 450 includes an amplifier circuit 902, a combiner/separator 904, and a plurality of chains 906-1 to 906-N.

The amplifier circuit 902 amplifies the signal provided from the frequency converter 440 or the signal provided from the combiner/separator 904. The amplifier circuit 902 may include a PA and an LNA. The amplifier circuit 902 has broadband characteristics capable of processing a broadband signal including RF signals in a plurality of bands.

The combiner/separator 904 separates a broadband RF signal into a plurality of signals, and provides the same to the plurality of chains 906-1 to 906-N. Alternatively, the combiner/separator 904 combines signals provided from the plurality of chains 906-1 to 906-N into one broadband RF signal. In this case, a plurality of signals provided to or from the plurality of chains 906-1 to 906-N has the same bandwidth as the broadband RF signal. For example, the separation of a signal by the combiner/separator 904 may be understood as separation or replication in power, instead of separation of a signal based on a specific frequency.

The plurality of chains 906-1 to 906-N may be configured in similar structures. As shown in FIG. 9A, a first chain 906-1 includes a first phase shifter 912*a*, a second phase shifter 912*b*, a first frequency combiner/separator 914*a*, and a second frequency combiner/separator 914*b*, a first filter 916*a*, a second filter 916*b*, and an amplifier circuit 918.

The first phase shifter 912*a* adjusts the phase of an RF signal in a first band. The second phase shifter 912*b* adjusts the phase of an RF signal in a second band. The phase value to be adjusted may be indicated by another element (e.g., the modem 410).

The first frequency combiner/separator 914*a* separates a broadband RF signal into two RF signals, or combines two RF signals into a broadband RF signal. The second frequency combiner/separator 914*b* separates a broadband RF signal into two band-specific RF signals, or combines two band-specific RF signals into a broadband RF signal. In this case, the two RF signals include an LB signal and an HB signal separated from a broadband RF signal, based on a specific frequency (e.g., a center frequency).

The first filter 916*a* removes unnecessary components, except the RF signal corresponding to the first band, from the LB signal that is phase-adjusted by the first phase shifter 912*a* or from the LB signal that is separated by the second frequency combiner/separator 914*b*. The first filter 916*a* may be an LBP. The second filter 916*b* removes unnecessary components, except the RF signal corresponding to the second band, from the HB signal that is phase-adjusted by the second phase shifter 912*b* or from the HB signal that is separated by the second frequency combiner/separator 914*b*. The second filter 916*b* may be an HBP.

The amplifier circuit 918 amplifies an RF signal. To this end, the amplifier circuit 918 may include a PA and an LNA. The amplifier circuit 918 has broadband characteristics capable of processing a broadband signal including RF signals corresponding to a plurality of bands.

When transmitting a signal in the structure shown in FIG. 9A, the RF signal provided from the frequency converter 440 is amplified by the amplifier circuit 902 and is separated into a plurality of signals by the combiner/separator 904, and then the plurality of signals is provided to the plurality of chains 906-1 to 906-N. The signal provided to a first chain 906-1 is separated into an LB signal and an HB signal by a first frequency combiner/separator 914*a*. The LB signal and the HB signal provided to the respective paths are phase-adjusted by the first phase shifter 912*a* and the second phase shifter 912*b*, are filtered by the first filter 916*a* and the second filter 916*b*, and are then combined into a broadband RF signal by the second frequency combiner/separator 914*b*. Thereafter, the broadband RF signal is amplified by the amplifier circuit 918, and is then transmitted through the antenna.

When receiving a signal in the structure shown in FIG. 9A, the broadband RF signal received through the antenna is amplified by the amplifier circuit 918, and is separated into an LB signal and an HB signal by the second frequency combiner/separator 914*b*. The LB signal and the HB signal provided to the respective paths are filtered by the first filter 916*a* and the second filter 916*b*, are phase-adjusted by the first phase shifter 912*a* and the second phase shifter 912*b*, and are then combined into a broadband RF signal by the first frequency combiner/separator 914*a*. Thereafter, the signals provided from the plurality of chains 906-1 to 906-N are combined by the combiner/separator 904, are amplified by an amplifier circuit 902, and are then provided to the frequency converter 440.

Figure 9B:
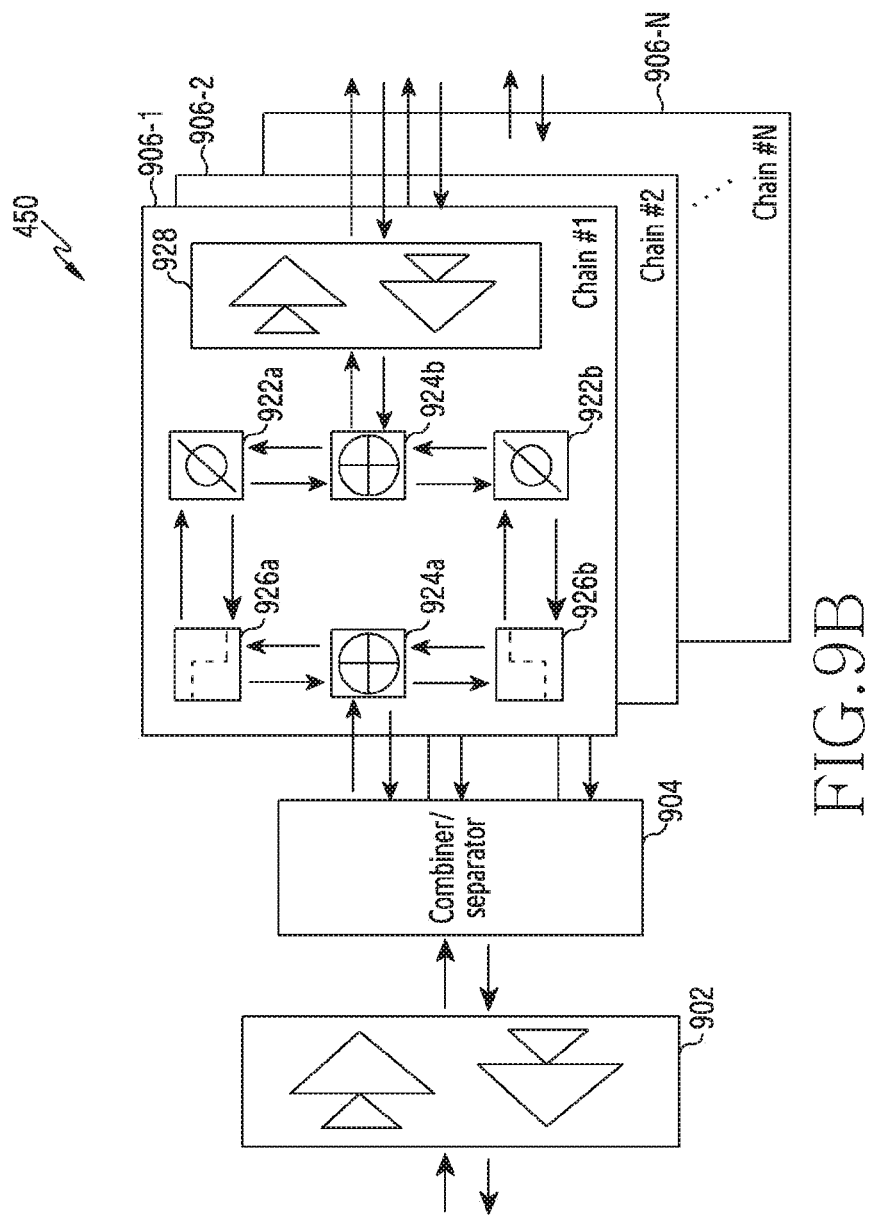
FIG. 9B illustrates a configuration of a beamformer in a wireless communication system according to an embodiment of the disclosure.

FIG. 9B illustrates a configuration of the beamformer in a wireless communication system according to an embodiment of the disclosure.

Referring to FIG. 9B, the beamformer 450 includes an amplifier circuit 902, a combiner/separator 904, and plurality of chains 906-1 to 906-N.

The amplifier circuit 902 amplifies a signal provided from the frequency converter 440 or a signal provided from the combiner/separator 904. The amplifier circuit 902 may include a PA and an LNA. The amplifier circuit 902 has broadband characteristics capable of processing a broadband signal including RF signals in a plurality of bands.

The combiner/separator 904 separates a broadband RF signal into a plurality of signals, and provides the same to a plurality of chains 906-1 to 906-N. Alternatively, the combiner/separator 904 combines signals provided from the plurality of chains 906-1 to 906-N into one broadband RF signal. In this case, a plurality of signals provided to or from the plurality of chains 906-1 to 906-N has the same bandwidth as the broadband RF signal. For example, the separation of a signal by the combiner/separator 904 may be understood as separation or replication in power, instead of separation of a signal based on a specific frequency.

The chains 906-1 to 906-N may be configured to have similar structures. Like the configuration shown in FIG. 9A, a first chain 906-1 includes a first phase shifter 922a, a second phase shifter 922b, a first frequency combiner/separator 924a, a second frequency combiner/separator 924b, a first filter 926a, a second filter 926b, and an amplifier circuit 928.

The first phase shifter 922a adjusts the phase of an RF signal in a first band. The second phase shifter 922b adjusts the phase of an RF signal in a second band. The phase value to be adjusted may be indicated by another element (e.g., the modem 410).

The first frequency combiner/separator 924a separates a broadband RF signal into two RF signals, or combines two RF signals into a broadband RF signal. The second frequency combiner/separator 924b separates a broadband RF signal into two band-specific RF signals, or combines two band-specific RF signals into a broadband RF signal. In this case, the two RF signals include an LB signal and an HB signal, which are separated from a broadband RF signal, based on a specific frequency (e.g., a center frequency).

The first filter 926a removes unnecessary components, except the RF signal corresponding to the first band, from the LB signal that is phase-adjusted by the first phase shifter 922a or from the LB signal that is separated by the first frequency combiner/separator 924a. The first filter 926a may be an LBP. The second filter 926b removes unnecessary components, except the RF signal corresponding to the second band, from the HB signal that is phase-adjusted by the second phase shifter 922b or from the HB signal that is separated by the first frequency combiner/separator 924a. The second filter 926b may be an HBP.

The amplifier circuit 928 amplifies an RF signal. To this end, the amplifier circuit 928 may include a PA and an LNA. The amplifier circuit 928 has broadband characteristics capable of processing a broadband signal including RF signals corresponding to a plurality of bands.

When transmitting a signal in the structure shown in FIG. 9B, the RF signal provided from the frequency converter 440 is amplified by the amplifier circuit 902 and is separated into a plurality of signals by the combiner/separator 904, and then the plurality of signals is provided to the chains 906-1 to 906-N. The signal provided to a first chain 906-1 is separated into an LB signal and an HB signal by a first frequency combiner/separator 924a. The LB signal and the HB signal provided to the respective paths are filtered by the first filter 926a and the second filter 926b, are phase-adjusted by the first phase shifter 922a and the second phase shifter 922b, and are then combined into a broadband RF signal by a second frequency combiner/separator 924b. Thereafter, the signals provided from the chains 906-1 to 906-N are combined by the combiner/separator 904, are amplified by the amplifier circuit 902, and are then provided to the frequency converter 440.

When receiving a signal in the structure shown in FIG. 9B, the broadband RF signal received through the antenna is amplified by the amplifier circuit 928, and is separated into an LB signal and an HB signal by the second frequency combiner/separator 924b. The LB signal and the HB signal provided to the respective paths are phase-adjusted by the first phase shifter 922a and the second phase shifter 922b, are filtered by the first filter 926a and the second filter 926b, and are then combined into a broadband RF signal by the first frequency combiner/separator 924a. Thereafter, the broadband RF signal is amplified by the amplifier circuit 902, and is then provided to the frequency converter 440.

In the circuit structures described above, the frequency converter 440 and the beamformer 450 may be implemented as a single IC, or may be separated as two ICs. In the case where the frequency converter 440 and the beamformer 450 are implemented as a single IC, there is an advantage of reducing mass production costs and the overall size of the circuit. In the case where the frequency converter 440 and the beamformer 450 are implemented as two ICs, there is an advantage of improving unnecessary components, produced by the frequency converter 440, using an external filter. Implementing the frequency converter 440 and beamformer 450 as a single IC is advantageous in the case where a small number of antenna arrays are provided, and implementing the frequency converter 440 and the beamformer 450 as a plurality of ICs is advantageous in the case where a large number of antenna arrays are provided. For example, the terminal may include about 4 to 16 beamforming ICs, but the base station may include about 16 to 256 beamforming ICs. If the frequency converter 440 and the beamformer 450 are implemented as a single IC, as many frequency converters as beamformers are required, but redundant operation of the large number frequency converters may cause unnecessary power consumption.

Figure 10A:
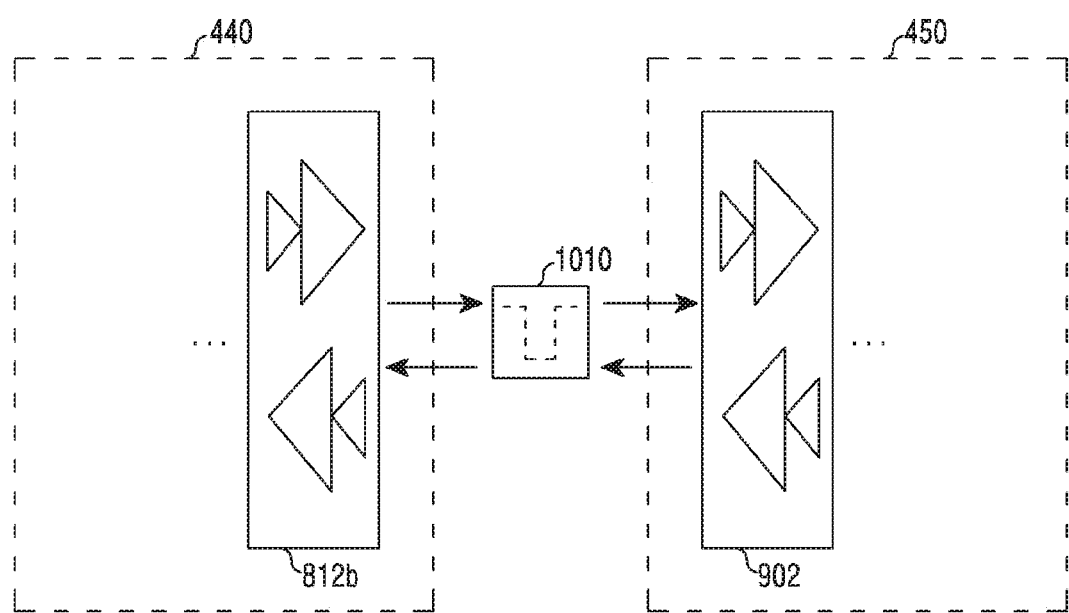
FIG. 10A illustrates a structure for connecting a frequency converter and a beamformer in a wireless communication system according to an embodiment of the disclosure.

FIG. 10A illustrates a structure for connecting a frequency converter and a beamformer in a wireless communication system according to an embodiment of the disclosure. FIG. 10A illustrates the case in which the frequency converter 440 and the beamformer 450 are implemented as separate ICs.

Referring to FIG. 10A, the frequency converter 440 and the beamformer 450 are packaged in separate ICs, and a filter 1010 is disposed between the second amplifier circuit 812b of the frequency converter 440 and the amplifier circuit 902 of the beamformer 450. The filter 1010 removes unnecessary signals from the signals transmitted between the frequency converter 440 and the beamformer 450. The filter 1010 may be a band stop filter (BSF).

Figure 10B:
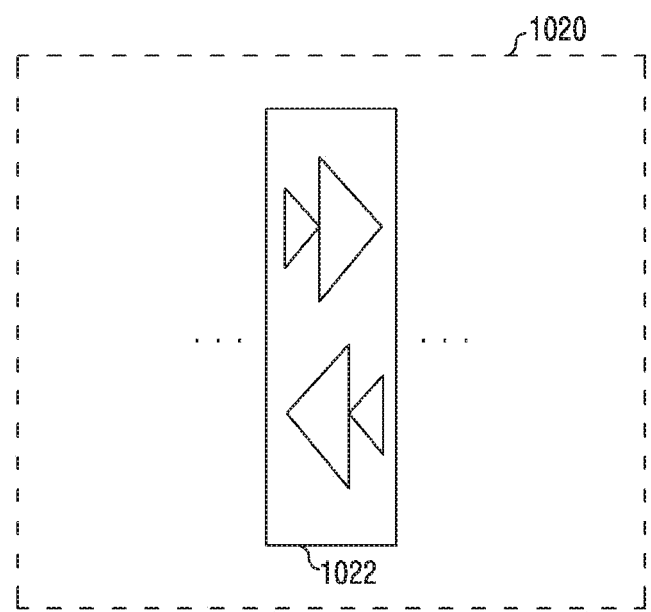
FIG. 10B illustrates a structure for connecting a frequency converter and a beamformer in a wireless communication system according to an embodiment of the disclosure.

FIG. 10B illustrates a structure for connecting a frequency converter and a beamformer in a wireless communication system according to an embodiment of the disclosure. FIG. 10A illustrates the case in which the frequency converter 440 and the beamformer 450 are implemented as a single IC. In the case of packaging the frequency converter 440 and the beamformer 450 in a single IC, a single amplifier circuit 1022 may be used, instead of the second amplifier circuit 812b of the frequency converter 440 and the amplifier circuit 902 of the beamformer 450. Accordingly, the overall size of the circuit and power consumption thereof may be relatively reduced.

Referring to FIG. 10B, in the case of implementing the frequency converter 440 and the beamformer 450 as a single IC 1020, the IC 1020 may include all of the elements shown in FIG. 8A or 8B and the elements shown in FIG. 9A or 9B while replacing the second amplifier circuit 812b and the amplifier circuit 902 by the amplifier circuit 1022. In this case, the first and second frequency combiner/separator 814a or 814b and the frequency combiner/separator 914a or 924b are disposed before and after the amplifier circuit 1022. Accordingly, the broadband RF signal is separated and combined before and after the amplifier circuit 1022. In order to eliminate the operation of separating and combining the RF signal(s), in the case of implementing the frequency converter 440 and the beamformer 450 as a single IC 1020 according to another embodiment of the disclosure, the first and second frequency combiner/separator 814a or 814b and the frequency combiner/separator 914a or 924b may be excluded, and the amplifier circuit 1022 and the combiner/separator 904 may be replaced by band-specific amplifier circuits and combiner/separators.

Figure 11:
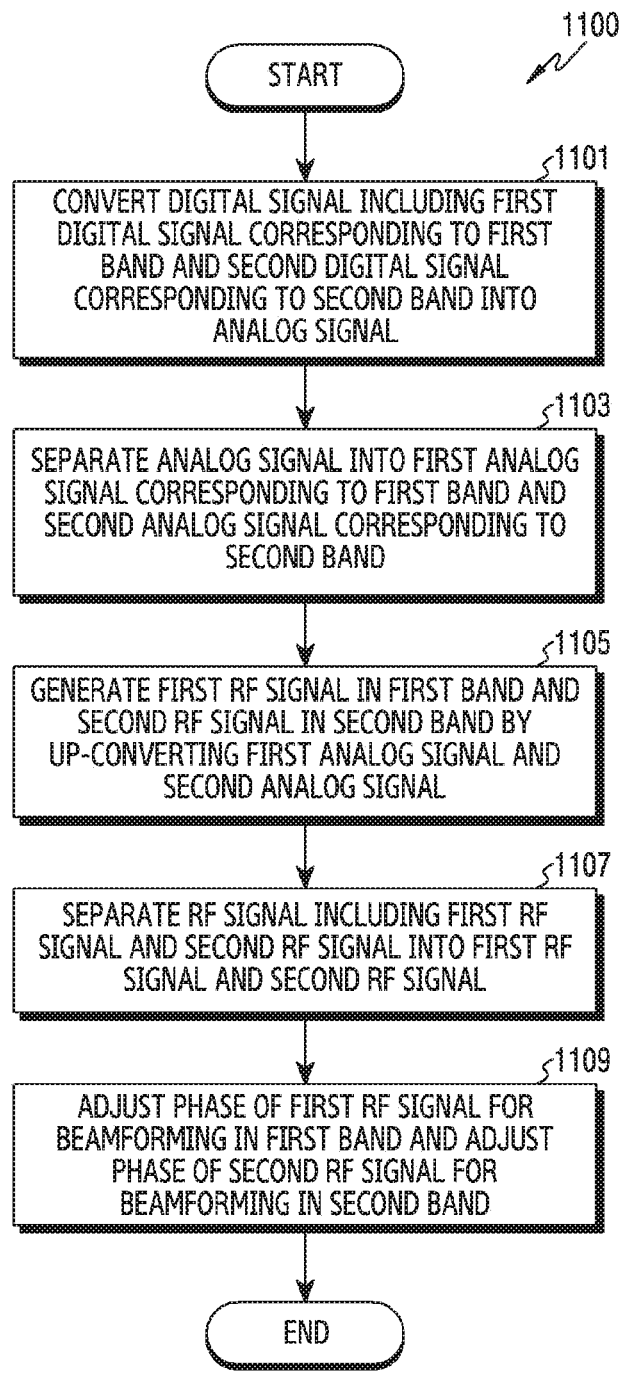
FIG. 11 illustrates a flowchart for transmitting signals through a plurality of bands in a wireless communication system according to an embodiment of the disclosure.

FIG. 11 illustrates a flowchart 1100 for transmitting signals through a plurality of bands in a wireless communication system according to an embodiment of the disclosure. FIG. 11 illustrates a method of operating the base station 110 or the terminal 120. For convenience of description below, the operation will be described based on a "transceiver".

Referring to FIG. 11, at operation 1101, the transceiver converts a digital signal including a first digital signal corresponding to a first band and a second digital signal corresponding to a second band into an analog signal. Here, the first digital signal has a first bandwidth, the second digital signal has a second bandwidth, and the digital signal including the first digital signal and the second digital signal has a third bandwidth. The third bandwidth may be greater than or equal to the sum of the first bandwidth and the second bandwidth, and the difference between the center frequency of the first digital signal and the center frequency of the second digital signal may be greater than half the sum of the first bandwidth and the second bandwidth. Additionally, according to another embodiment of the disclosure, the transceiver may convert a baseband signal into an IF band signal before performing the analog conversion.

At operation 1103, the transceiver separates the analog signal into a first analog signal corresponding to the first band and a second analog signal corresponding to the second band. Additionally, before separating the analog signal, the transceiver may amplify the analog signal, and may then separate the same into the first analog signal and the second analog signal.

At operation 1105, the transceiver generates a first RF signal in the first band and a second RF signal in the second band by up-converting the first analog signal and the second analog signal. Additionally, the transceiver may filter each of the first RF signal and the second RF signal before or after the up-conversion. In addition, the transceiver may generate an RF signal having a third bandwidth by combining the first RF signal and the second RF signal.

At operation 1107, the transceiver separates the RF signal having the third bandwidth, which includes the first RF signal and the second RF signal, into the first RF signal and the second RF signal. Afterwards, for phase-adjustment for beamforming, the transceiver may separate the RF signal having the third bandwidth into a first RF signal having a first bandwidth and a second RF signal having a second bandwidth.

At operation 1109, the transceiver adjusts the phase of the first RF signal for beamforming in the first band, and adjusts the phase of the second RF signal for beamforming in the second band. The phase adjustment may be performed for each chain. For example, the transceiver may separate the RF signal having the third bandwidth into as many signals as there are chains, may separate the RF signal into a first RF signal and a second RF signal in each chain, and may then adjust the phases thereof.

According to the various embodiments described above, signals in a plurality of bands may be transmitted or received. It is possible to operate resources as will be described below with reference to FIG. 12A or 12B by transmitting or receiving signals in a plurality of bands using the above structures.

Figure 12A:
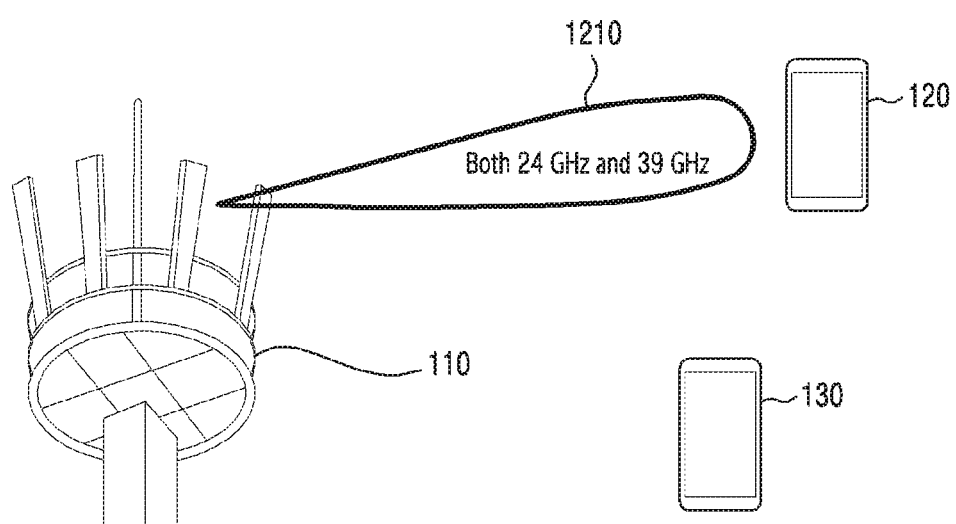
FIG. 12A illustrates a case in which a plurality of bands is simultaneously used in a wireless communication system according to an embodiment of the disclosure.

FIG. 12A illustrates a case in which a plurality of bands is simultaneously used in a wireless communication system according to an embodiment of the disclosure.

Referring to FIG. 12A, the base station 110 may communicate with the terminal 120 by simultaneously using two bands (e.g., a 24 GHz band and a 39 GHz band 1210). The two bands may be used during the same period of time rather than an orthogonal period of time.

Figure 12B:
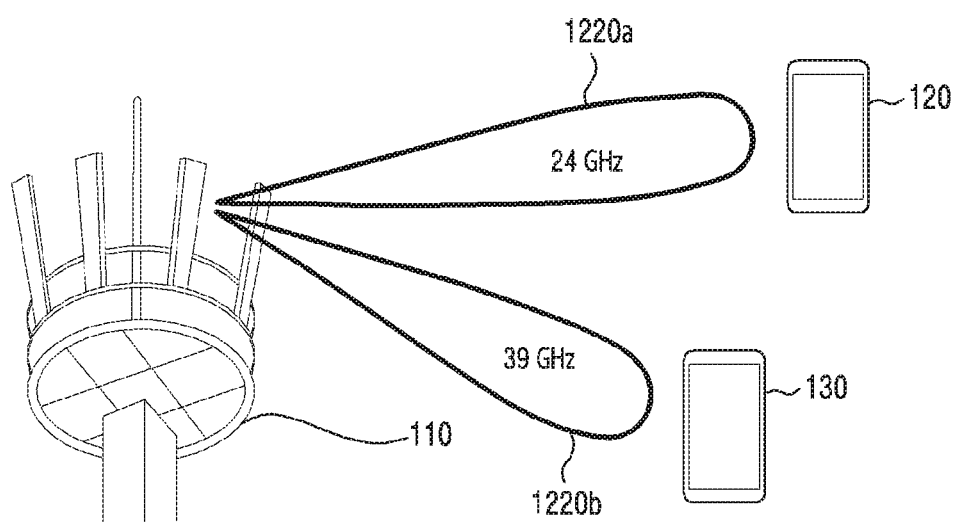
FIG. 12B illustrates a case in which a plurality of bands is simultaneously used in a wireless communication system according to an embodiment of the disclosure.

FIG. 12B illustrates a case in which a plurality of bands is simultaneously used in a wireless communication system according to an embodiment of the disclosure.

Referring to FIG. 12B, the base station 110 may communicate with the terminal 120 using a first band (e.g., a 24GHz band 1220a), and may communicate with the terminal 130 using a second band (e.g., a 39 GHz band 1220b). The two bands may be used during the same period of time rather than an orthogonal period of time.

According to an embodiment, a transceiver in a wireless communication system, the transceiver comprises a first circuit configured to convert a digital signal having a third bandwidth, which comprises a first digital signal having a first bandwidth corresponding to a first band and a second digital signal having a second bandwidth corresponding to a second band, into an analog signal, a second circuit configured to separate the analog signal into a first analog signal corresponding to the first band and a second analog signal corresponding to the second band, up-convert the first analog signal and the second analog signal to generate a first radio frequency (RF) signal in the first band and a second RF signal in the second band, and output an RF signal having the third bandwidth, which comprises the first RF signal and the second RF signal, and a third circuit configured to separate the RF signal into the first RF signal and the second RF signal, adjust a phase of the first RF signal for beamforming in the first band, and adjust a phase of the second RF signal for beamforming in the second band.

In some embodiments, wherein the third bandwidth is greater than or equal to a sum of the first bandwidth and the second bandwidth, and wherein a difference between a center frequency of the first digital signal and a center frequency of the second digital signal is greater than half the sum of the first bandwidth and the second bandwidth.

In some embodiments, wherein the first circuit is configured to up-convert the first digital signal and the second digital signal into signals in an intermediate frequency (IF) band.

In some embodiments, wherein the first circuit is further configured to filter, amplify, and output the analog signal.

In some embodiments, the transceiver further comprises a fourth circuit configured to provide frequency signals for an operation of up-converting a frequency by the second circuit.

In some embodiments, wherein the fourth circuit is further configured to convert outputs of one oscillator at different amplification factors to generate frequency signals in different frequencies.

In some embodiments, wherein the fourth circuit is further configured to generate frequency signals in different frequencies using a plurality of oscillators.

In some embodiments, wherein the second circuit is further configured to filter the first RF signal and the second RF signal and to then combine the filtered RF signals, thereby generating the RF signal having the second bandwidth.

In some embodiments, wherein the third circuit is further configured to generate RF signals to be supplied to a plurality of chains by separating power of the RF signal having the third bandwidth.

In some embodiments, wherein the third circuit is configured to filter the phase-adjusted first and second RF signals, combine the filtered RF signals, and then radiate the same through an antenna.

According to an embodiment, A signal processing device for a transceiver in a wireless communication system, the signal processing device comprises a conversion circuit configured to convert a digital signal having a third bandwidth, which comprises a first digital signal having a first bandwidth corresponding to a first band and a second digital signal having a second bandwidth corresponding to a second band, into an analog signal.

In some embodiments, the signal processing device further comprises a mixer configured to up-convert the first digital signal and the second digital signal to signals in an intermediate frequency (IF) band.

In some embodiments, the signal processing device further comprises a filter configured to filter the analog signal, and an amplifier circuit configured to amplify the filtered analog signal.

According to an embodiment, A signal processing device for a transceiver in a wireless communication system, the signal processing device comprises, a separator configured to separate an analog signal having a third bandwidth into a first analog signal having a first bandwidth corresponding to a first band and a second analog signal having a second bandwidth corresponding to a second band, mixers configured to up-convert the first analog signal and the second analog signal to generate a first radio frequency (RF) signal in the first band and a second RF signal in the second band, and a combiner configured to generate an RF signal having the third bandwidth, which comprises the first RF signal and the second RF signal.

In some embodiments, the signal processing device further comprises filters configured to filter the first RF signal and the second RF signal.

According to an embodiment, A signal processing device for a transceiver in a wireless communication system, the signal processing device comprises a separator configured to separate a radio frequency (RF) signal having a third bandwidth into a first RF signal having a first bandwidth corresponding to a first band and a second RF signal having a second bandwidth corresponding to a second band, and a phase shifter configured to adjust a phase of the first RF signal for beamforming in the first band and adjust the phase of the second RF signal for beamforming in the second band.

In some embodiments, wherein the separator is further configured to generate RF signals to be supplied to a plurality of chains by separating power of the RF signal having the third bandwidth.

In some embodiments, the signal processing device further comprises filters configured to filter the phase-adjusted first and second RF signals, and a combiner configured to combine the filtered RF signals.

In some embodiments, wherein the filter includes a band stop filter (BSF).

In some embodiments, wherein the filter includes a low-pass filter (LPF) and a high-pass filter (HPF).

According to an embodiment, A method of operating a transceiver in a wireless communication system, the method comprises converting a digital signal having a third bandwidth, which comprises a first digital signal having a first bandwidth corresponding to a first band and a second digital signal having a second bandwidth corresponding to a second band, into an analog signal, separating the analog signal into a first analog signal corresponding to the first band and a second analog signal corresponding to the second band, up-converting the first analog signal and the second analog signal to generate a first radio frequency (RF) signal in the first band and a second RF signal in the second band, separating the RF signal having the third bandwidth, which comprises the first RF signal and the second RF signal, into the first RF signal and the second RF signal, adjusting a phase of the first RF signal for beamforming in the first band, and adjusting a phase of the second RF signal for beamforming in the second band.

In some embodiments, wherein the third bandwidth is greater than or equal to a sum of the first bandwidth and the second bandwidth, and wherein a difference between a center frequency of the first digital signal and a center frequency of the second digital signal is greater than half the sum of the first bandwidth and the second bandwidth.

In some embodiments, the method further comprises selecting serving beams through a beam searching or management procedure, and performing subsequent communication through a resource in a quasi-co-located (QCL) relationship with the resource that transmitted the serving beams.

As described above, even if different bands having a frequency interval of several to tens of GHz are used, the base station 110 may provide services to any one terminal or a plurality of different terminals by simultaneously using a plurality of bands.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

While the disclosure has been shown and described with reference to various embodiments thereof, it will be understood by those skilled in the art that various changes in form and details may be made therein without departing from the spirit and the scope of the disclosure as defined by the appended claims and their equivalents.

What is claimed is:

1. A transceiver in a wireless communication system, the transceiver comprising:
   a first circuit configured to convert a digital signal having a third bandwidth, which comprises a first digital signal having a first bandwidth corresponding to a first band and a second digital signal having a second bandwidth corresponding to a second band, into an analog signal;
   a second circuit configured to separate the analog signal into a first analog signal corresponding to the first band and a second analog signal corresponding to the second band, up-convert the first analog signal and the second analog signal to generate a first radio frequency (RF) signal in the first band and a second RF signal in the second band, and output an RF signal having the third bandwidth, which comprises the first RF signal and the second RF signal; and
   a third circuit configured to separate the RF signal into the first RF signal and the second RF signal, adjust a phase of the first RF signal for beamforming in the first band, and adjust a phase of the second RF signal for beamforming in the second band.

2. The transceiver of claim 1,
   wherein the third bandwidth is greater than or equal to a sum of the first bandwidth and the second bandwidth, and
   wherein a difference between a center frequency of the first digital signal and a center frequency of the second digital signal is greater than half the sum of the first bandwidth and the second bandwidth.

3. The transceiver of claim 1, wherein the first circuit is further configured to up-convert the first digital signal and the second digital signal into signals in an intermediate frequency (IF) band.

4. The transceiver of claim 1, wherein the first circuit is further configured to filter, amplify, and output the analog signal.

5. The transceiver of claim 1, further comprising a fourth circuit configured to provide frequency signals for an operation of up-converting a frequency by the second circuit.

6. The transceiver of claim 5, wherein the fourth circuit is further configured to convert outputs of one oscillator at different amplification factors to generate frequency signals in different frequencies.

7. The transceiver of claim 5, wherein the fourth circuit is further configured to generate frequency signals in different frequencies using a plurality of oscillators.

8. The transceiver of claim 1, wherein the second circuit is further configured to filter the first RF signal and the second RF signal and to then combine the filtered RF signals, thereby generating the RF signal having the second bandwidth.

9. The transceiver of claim 1, wherein the third circuit is further configured to generate RF signals to be supplied to a plurality of chains by separating power of the RF signal having the third bandwidth.

10. The transceiver of claim 1, wherein the third circuit is further configured to filter the phase-adjusted first and second RF signals, combine the filtered RF signals, and then radiate the same through an antenna.

11. A signal processing device for a transceiver in a wireless communication system, the signal processing device comprising:
    a separator configured to separate an analog signal having a third bandwidth into a first analog signal having a first bandwidth corresponding to a first band and a second analog signal having a second bandwidth corresponding to a second band;
    mixers configured to up-convert the first analog signal and the second analog signal to generate a first radio frequency (RF) signal in the first band and a second RF signal in the second band; and
    a combiner configured to generate an RF signal having the third bandwidth, which comprises the first RF signal and the second RF signal.

12. The signal processing device of claim 11, further comprising filters configured to filter the first RF signal and the second RF signal.

* * * * *